Aug. 2, 1927.
A. G. DUNBAR
1,637,987
PISTON
Filed Dec. 5, 925
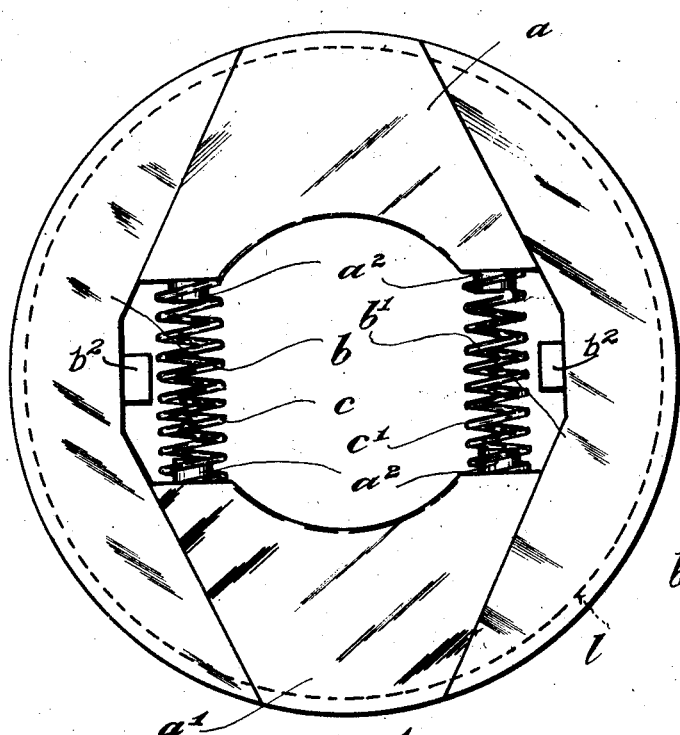
Fig. 1.
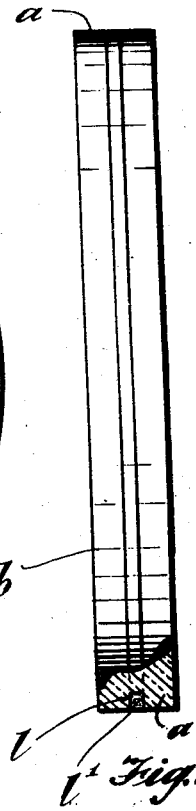
Fig. 2.
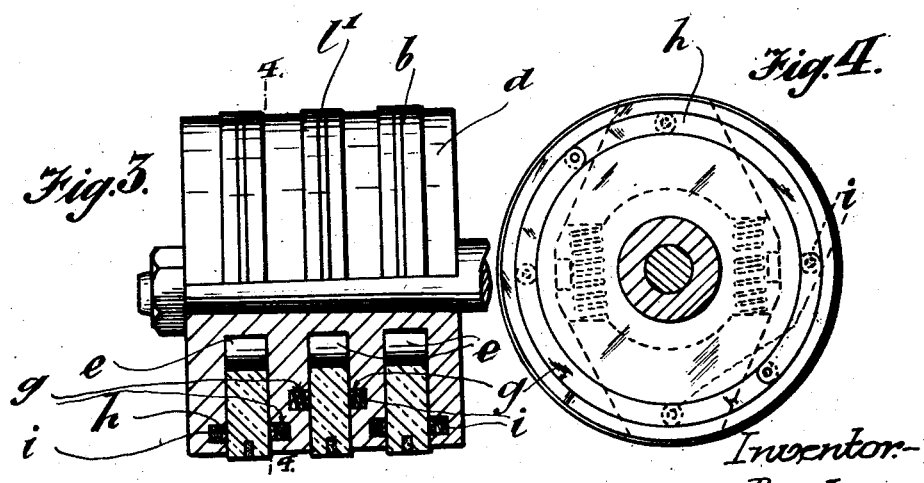
Inventor:-
Alexander Garden Dunbar.
by his Attorneys.
Howson & Howson Patented Aug. 2, 1927.

1,637,987

UNITED STATES PATENT OFFICE.

ALEXANDER GARDEN DUNBAR, OF GLASGOW, SCOTLAND.

PISTON.

Application filed December 5, 1925, Serial No. 73,485, and in Great Britain January 9, 1925.

This invention has reference to steam engine pistons, pump pistons, internal combustion engine pistons and other pistons and has for its object to provide an improved packing which will have a greater useful life than the packing rings usually employed for such purposes.

A further object of my invention is to provide improvements designed to minimize friction of the piston packing on the cylinder wall.

A further object of my invention consists in providing improvements designed to maintain a tight joint between the piston and packing and to minimize friction between the packing and piston so as to permit the packing to take up wear.

Those and other improvements will be hereafter described and claimed.

According to my invention a piston is provided with one or more annular grooves and into each groove is fitted a packing comprising a plurality of sections one or more of which is, or are, spring loaded so as to force same outwards, and the shape of the sections such that the spring influenced section, or sections, by the action of an inclined plane forces, or force, the other section, or sections, outwards.

Said sections may be provided with a groove on the periphery thereof to receive a lubricating packing of hard graphite or the like.

The sides of the annular recess in the piston into which the sections are fitted are preferably grooved to receive packing rings which bear on the sides of the sections, helical or other springs being preferably provided to force such rings against the sides of the sections.

On the annexed sheet of drawings is illustrated a preferred embodiment of my invention and whereon:—

Figure 1 illustrates an elevation of the improved packing.

Figure 2 is an end elevation thereof.

Figure 3 illustrates a piston partly in section fitted with the improved packing and Figure 4 is a section on the line 4—4 Figure 3.

The packing illustrated consists of four sections or sectors $a$, $a^1$ and $b$, $b^1$, the sections $a$, $a^1$ being of a wedge shape, i. e., having opposite sides inclined as indicated. Those sections are forced outwards with respect to each other by two or more helical springs $c$, $c^1$ located between said sections and held under tension.

The other two sections $b$, $b^1$ are shaped as illustrated to accommodate the sections $a$, $a^1$. The spring loaded sections provide a considerably smaller portion of the periphery of the packing than the other two sections.

Each section is provided with a groove $l$ on its periphery, such grooves, when the sections are assembled forming an annular recess into which a packing of hard graphite or the like $l^1$ is inserted.

Projecting pins $a^2$ on sections $a$, $a^1$, serve to maintain the ends of the springs $c$, $c^1$ in position and the projections $b^2$ on sections $b$, $b^1$ serve to prevent the centre of the springs arching outwards.

Such packing formed by the assembled sections is inserted in an annular groove formed in the piston head, said groove being cut considerably deeper than is necessary to accommodate packing rings of usual construction.

In Figures 3 and 4 is shown a piston $d$ provided with three annular grooves $e$ and in each of which is inserted a packing similar to that shown in Figures 1 and 2.

In order to maintain the packing tightly in the piston grooves and also to permit of expansion, the sides of said grooves are provided with annular recesses $g$ into which are inserted packing rings $h$ which bear on the sides of the sections $a$, $a^1$ and $b$, $b^1$, small helical springs $i$, or other springs being provided to force the rings against the sides of said sections.

Said rings are made in halves to enable same to be inserted in the grooves, the halves being thereafter joined by any suitable means.

In operation the spring loaded members $a$, $a^1$ are forced outwards with respect to each other by the springs $c$, $c^1$ and by reason of the co-acting inclined faces the other two members $b$, $b^1$ are likewise forced outwards with respect to each other and by such means all wear of the sections and cylinder is taken up automatically.

By reason of the angles of said inclined faces the spring loaded members $a$, $a^1$ have a greater travel than the others and the wear on their surface regulates the movement of all four sections.

The graphite packing serves as a lubricator and the side packing rings serve to retain the sections in position and prevent leakage between the sections and the sides of the annular recesses into which they are fitted.

The co-acting sides of the sections may be curved.

What I claim is:—

1. A packing for pistons comprising two diametrically opposite segmental sections of wedge formation, two helical parallel springs acting on said sections, and two diametrically opposite segments to co-operate with said wedge segmental sections.

2. In pistons a packing comprising four segmental sections accommodated in a relatively deep annular recess provided in the piston, two of said segmental sections being of wedge like formation and the other two shaped to co-operate therewith, spring means acting on said wedge sections, and packing rings located in the walls of said recess and bearing on the segments.

3. In pistons, a packing comprising four segmental sections accommodated within a relatively deep annular recess, two diametrically opposite sections being of wedge formation and the other two shaped to co-operate therewith, spring means acting on said wedge sections, packing rings located in annular recesses formed in the walls of said groove, and spring means bearing on said rings.

4. In pistons, a packing comprising a plurality of sections accommodated within a deep annular groove in the piston, at least one of said sections being of wedge formation, and the others shaped to co-operate therewith, spring means acting on a wedge section and packing located in the walls of the annular recess and bearing on the said sections.

5. For pistons, a packing comprising four sections, two of said sections being of wedge formation and the other two sections shaped to accommodate the wedge sections and helical springs extending between said wedge shape sections and tending to force them apart.

6. For pistons, a packing comprising four sections, two oppositely disposed sections being of wedge formation and the other two sections shaped to accommodate the wedge sections helical springs extending between said wedge shape sections and tending to force them apart, and means to prevent the said springs arching outwards.

ALEX. G. DUNBAR.